(12) United States Patent
Paver

(10) Patent No.: US 7,529,947 B2
(45) Date of Patent: May 5, 2009

(54) DETERMINING POWER CONSUMPTION OF AN APPLICATION

(75) Inventor: Nigel C. Paver, Austin, TX (US)

(73) Assignee: Marvell International Ltd., Hamilton (BM)

( * ) Notice: Subject to any disclaimer, the term of this patent is extended or adjusted under 35 U.S.C. 154(b) by 747 days.

(21) Appl. No.: 10/815,567

(22) Filed: Mar. 31, 2004

(65) Prior Publication Data

US 2005/0223250 A1    Oct. 6, 2005

(51) Int. Cl.
*G06F 1/00* (2006.01)
*G06F 1/32* (2006.01)
*G01K 7/00* (2006.01)

(52) U.S. Cl. .................. 713/300; 713/320; 702/130
(58) Field of Classification Search .......... 713/300, 713/320, 322, 324, 330; 717/161
See application file for complete search history.

(56) References Cited

U.S. PATENT DOCUMENTS

| | | | | |
|---|---|---|---|---|
| 5,563,928 A * | 10/1996 | Rostoker et al. | ............... | 377/20 |
| 5,623,647 A * | 4/1997 | Maitra | ............... | 713/501 |
| 5,732,215 A * | 3/1998 | Boutaghou et al. | ............... | 710/74 |
| 5,870,614 A * | 2/1999 | Ang | ............... | 713/320 |
| 5,996,084 A * | 11/1999 | Watts | ............... | 713/323 |
| 6,647,346 B1 * | 11/2003 | Zikes | ............... | 702/65 |
| 6,804,632 B2 * | 10/2004 | Orenstien et al. | ............... | 702/188 |
| 6,834,353 B2 * | 12/2004 | Smith et al. | ............... | 713/320 |
| 6,880,497 B1 * | 4/2005 | Avery et al. | ............... | 123/41.12 |
| 6,901,524 B2 * | 5/2005 | Watts, Jr. | ............... | 713/322 |
| 6,948,082 B2 * | 9/2005 | Gschwind et al. | ............... | 713/320 |
| 7,069,189 B2 * | 6/2006 | Rotem | ............... | 702/189 |
| 7,174,194 B2 * | 2/2007 | Chauvel et al. | ............... | 455/574 |
| 2002/0065049 A1 * | 5/2002 | Chauvel et al. | ............... | 455/66 |
| 2002/0078681 A1 * | 6/2002 | Carberry et al. | ............... | 60/280 |
| 2003/0158697 A1 * | 8/2003 | Gold et al. | ............... | 702/132 |
| 2003/0171881 A1 * | 9/2003 | Park | ............... | 702/63 |
| 2003/0216881 A1 * | 11/2003 | Weiss et al. | ............... | 702/130 |
| 2003/0217297 A1 * | 11/2003 | Gschwind et al. | ............... | 713/300 |
| 2004/0080717 A1 * | 4/2004 | Pate | ............... | 353/52 |
| 2004/0117669 A1 * | 6/2004 | Wilson | ............... | 713/300 |
| 2004/0128663 A1 * | 7/2004 | Rotem | ............... | 717/161 |
| 2004/0143410 A1 * | 7/2004 | Clabes et al. | ............... | 702/107 |
| 2004/0159904 A1 * | 8/2004 | Clabes et al. | ............... | 257/467 |
| 2005/0125701 A1 * | 6/2005 | Hensbergen et al. | ............... | 713/320 |
| 2005/0138442 A1 * | 6/2005 | Keller et al. | ............... | 713/300 |
| 2005/0166166 A1 * | 7/2005 | Chandra et al. | ............... | 716/4 |
| 2005/0223258 A1 * | 10/2005 | Watts, Jr. | ............... | 713/322 |

* cited by examiner

*Primary Examiner*—Suresh K Suryawanshi

(57) ABSTRACT

In one embodiment, a method is provided. The method of this embodiment provides monitoring one or more sensor outputs of a sensor, the sensor to measure a power consumption property of the chip, and each sensor output to indicate a measurement of the power consumption property; and recording a time that each of the one or more sensor outputs indicates an existence of the power consumption property at the measurement corresponding to each of the one or more sensor outputs.

24 Claims, 4 Drawing Sheets

DETERMINING POWER CONSUMPTION OF AN APPLICATION

FIELD

Embodiments of this invention relate to determining power consumption of an application.

BACKGROUND

Under the current state of the art, power consumption properties of a processor may be measured to, for example, prevent the silicon device (hereinafter "chips") on which the processor resides from overheating. One example of a power consumption property is temperature. For example, chips may have on-chip temperature sensors that may each include a number of outputs that indicate a current temperature (or temperature range) of the chip. Since the efficiency at which an application executes may be related to how much power is consumed by the application code, it may be useful to know which parts of the application consume the most power so that the application code may be optimized.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

Examples described below are for illustrative purposes only, and are in no way intended to limit embodiments of the invention. Thus, where examples may be described in detail, or where a list of examples may be provided, it should be understood that the examples are not to be construed as exhaustive, and do not limit embodiments of the invention to the examples described and/or illustrated. Furthermore, illustrated embodiments are intended to illustrate an example of an embodiment, and should not be construed as limiting embodiments of the invention.

Figure 1:
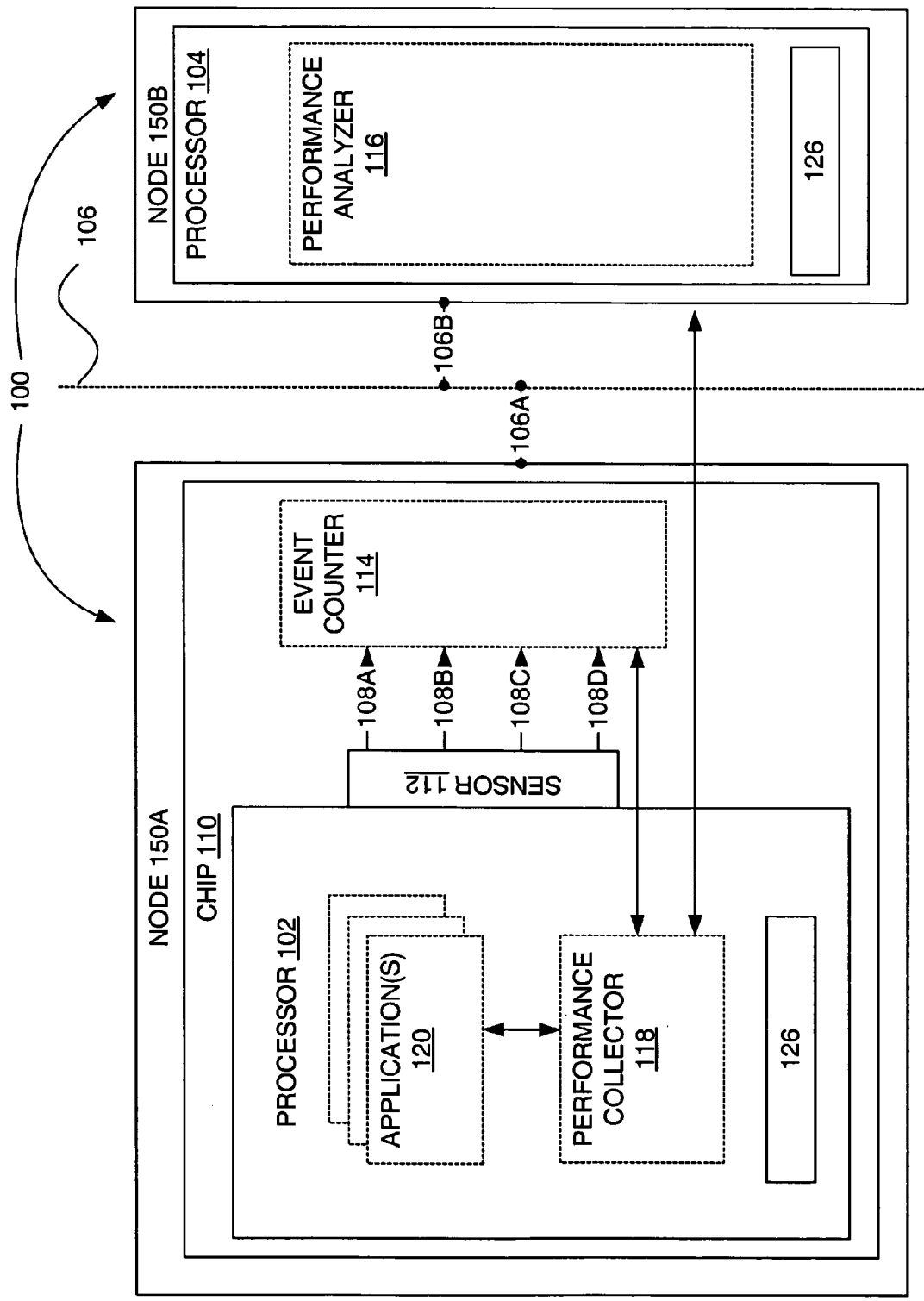
FIG. 1 illustrates a system according to first embodiment.
Figure 2:
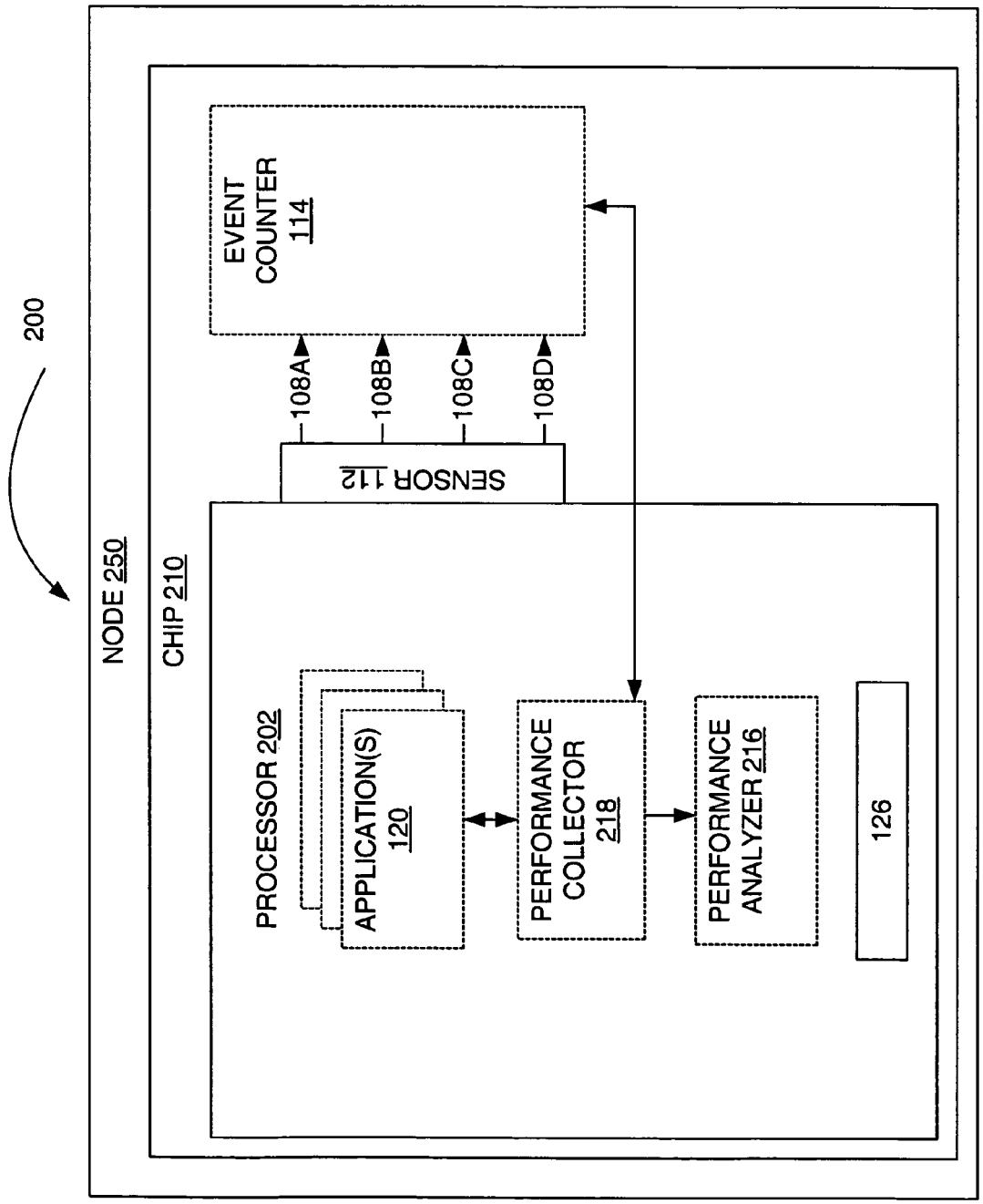
FIG. 2 illustrates a system according to a second embodiment.

FIG. 1 illustrates a system 100 that may be used in one embodiment of the invention, and FIG. 2 illustrates a system 200 that may be used in another embodiment of the invention. System 100 may comprise a first node 150A, and a second node 150B, where first node 150A and second node 150B may communicate via connections 106A, 106B to a network 106. System 200 may comprise a first node 250.

System 100, 200 may comprise circuitry 126 to perform one or more operations described herein. Circuitry 126 may be embodied in hardware and be hardwired to perform the one or more operations. Some or all of circuitry 126 may be comprised in, for example, processor 102, 202 in other structures, systems, and/or devices that may be, for example, comprised in a motherboard (not illustrated), and/or communicatively coupled to bus 106, and may exchange data and/or commands with one or more other components in system 100, 200. Such other components may comprise, for example, memory, and/or processor 102, 202. Many possibilities exist; however, not all possibilities may be illustrated.

Additionally or alternatively, circuitry 126 may be embodied in software to execute machine-executable instructions to perform these operations. For example, circuitry 126 may comprise memory that may store machine-executable instructions that may be executed by circuitry 126 to perform these operations. Additionally or alternatively, circuitry 126 may access machine-executable instructions from one or more other memories, such as memory.

Circuitry 126 may comprise, for example, one or more digital circuits, one or more analog circuits, one or more state machines, programmable circuitry, and/or one or more ASIC's (Application-Specific Integrated Circuits). Additionally or alternatively, circuitry 126 carrying out some or all of the operations described herein may result from the execution of program instructions and/or the accessing, operation upon, and/or manipulation of data by circuitry 126.

Figure 3:
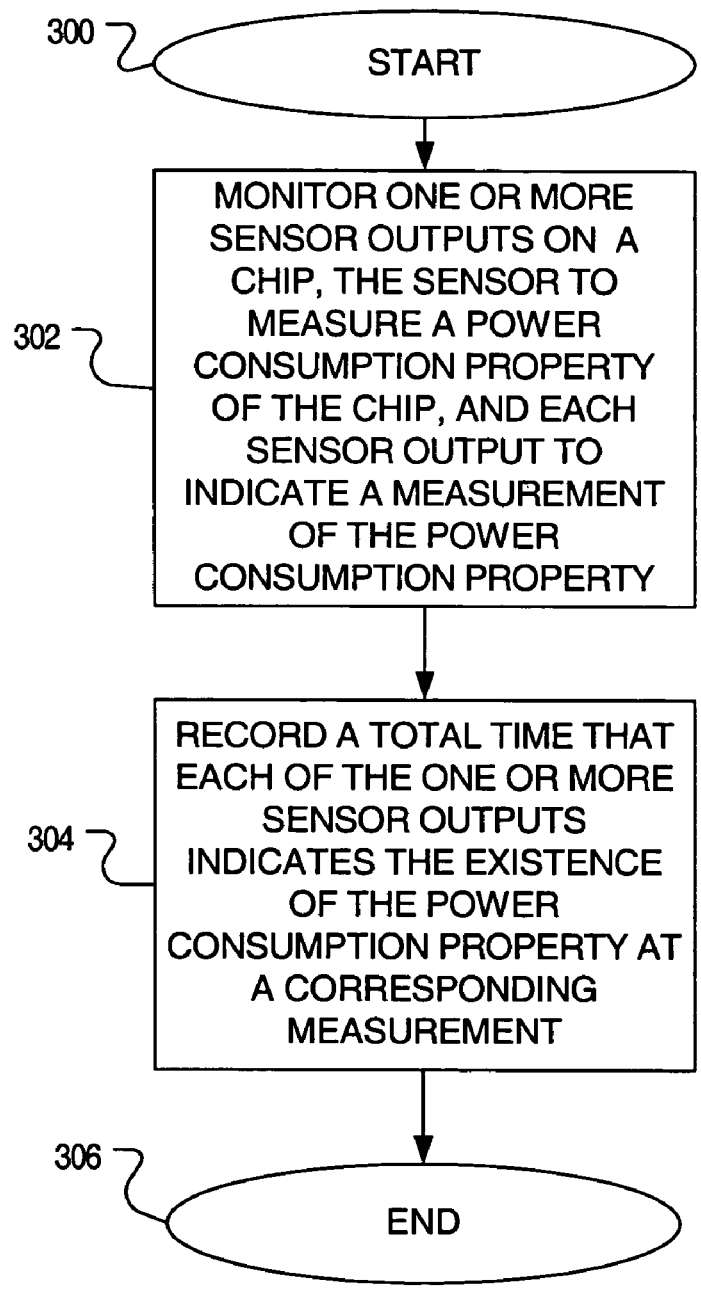
FIG. 3 is a flowchart illustrating a method according to one or more embodiments.

FIG. 3 illustrates a method according to at least one embodiment of the invention. The method begins at block 300 and continues to block 302 where circuitry 126 may monitor one or more sensor outputs 108A, 108B, 108C, 108D of sensor 112. Sensor 112 may be on chip 110, 210. Alternatively and/or alternatively, sensor 112 may be part of a component external to chip 110, 210 such as, for example, a power management integrated circuit, or a power supply that may determine property being consumed by chip 110, 210.

Sensor 112 may measure a power consumption property of chip 110, 210 and each sensor output 108A, 108B, 108C, 108D may indicate the existence of the power consumption property. In one embodiment, the power consumption property may comprise temperature, and each sensor output 108A, 108B, 108C, 108D may indicate a temperature that corresponds to one or more temperatures of the chip 110, 210. A temperature may refer to a single temperature, or one or more ranges of temperatures. Therefore, each sensor output 108A, 108B, 108C, 108D may indicate that the power consumption property of the chip 110, 210 is within a range of measurements of the power consumption property corresponding to the given sensor output 108A, 108B, 108C, 108D. Other power consumption properties may be measured. For example, the measured power consumption property may be voltage drop (IR).

In one embodiment, chip 110, 210 may comprise processor 102, 202. Processor 102, 202 may comprise, for example, an Intel® XScale® microprocessor (hereinafter "XScale®") that is commercially available from the Assignee of the subject application. Of course, alternatively, processor 102, 202 may comprise another type of microprocessor, such as, for example, a microprocessor that is manufactured and/or commercially available from a source other than the Assignee of the subject application, without departing from this embodiment.

At block 304, circuitry 126 may record a time that each of the one or more sensor outputs 108A, 108B, 108C, 108D indicates the existence of the power consumption property at a corresponding measurement. For example, if sensor indicates a certain power consumption property (e.g., temperature) at a certain measurement (e.g., 75° C.), such indication may be communicated to a corresponding one of the sensor outputs 108A, 108B, 108C, 108D. The corresponding sensor output 108A, 108B, 108C, 108D, therefore, may indicate the presence of the power consumption property by indicating the measurement or a range of the measurement for the power consumption property of chip 110, 210. The recorded time may be cumulated.

Circuitry 126 may monitor one or more sensor outputs 108A, 108B, 108C, 108D for such indication, and record the time that the one or more monitored sensor outputs 108A, 108B, 108C, 108D indicates the presence of the power consumption property at corresponding measurements. The time may be stored in a database, for example. The time may additionally be outputted, and/or accessed. Additionally, time may be provided in various metrics, including milliseconds, seconds, percentages, number of times the sensor outputs indicates the power consumption property, or any combination of these or other metrics not mentioned, for example.

The method ends at block 306.

In one embodiment, circuitry 126 incorporating the method described above may be embodied in an event counter 114. For example, event counter 114 may be provided by the Intel® XScale® microarchitecture (hereinafter "XScale®") that is commercially available from the Assignee of the subject application. In this embodiment event counter 114 may monitor sensor outputs 108A, 108B, 108C, 108D of sensor 112. Event counter 114 may additionally monitor and count other events, such as pipeline stalls and cache misses.

Figure 4:
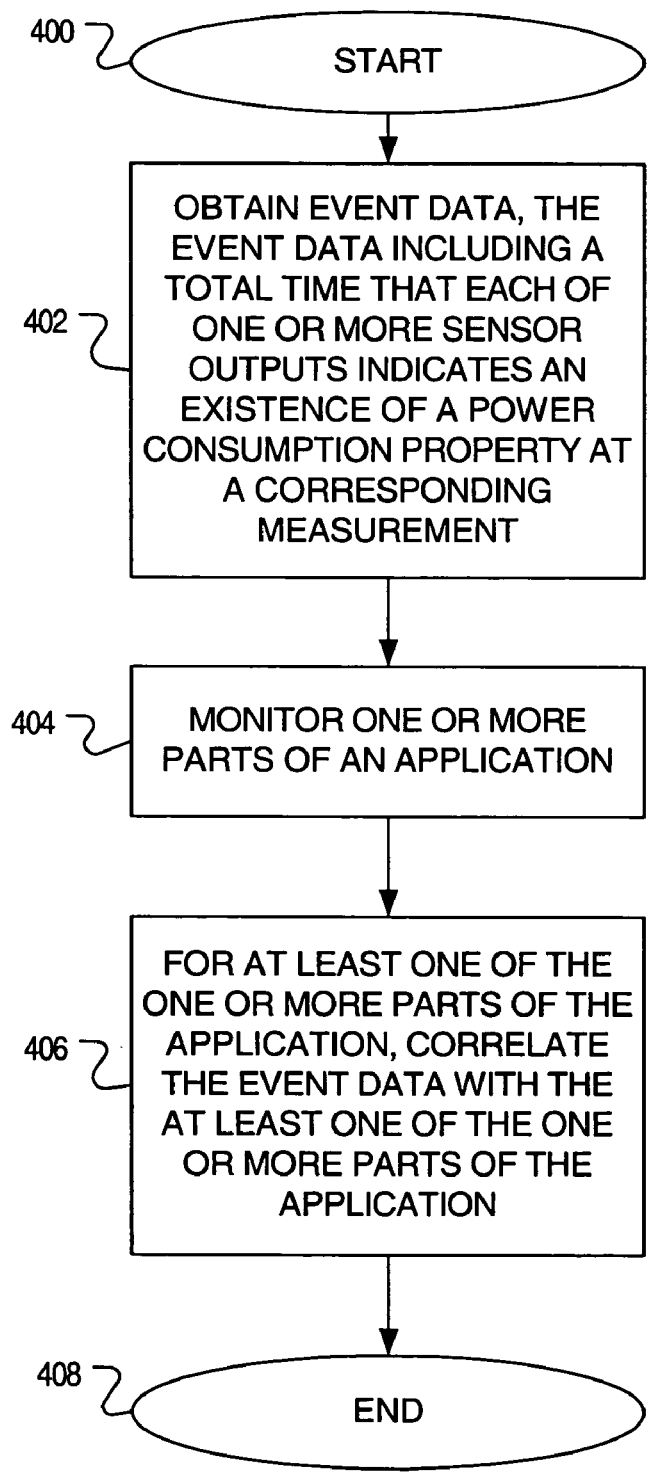
FIG. 4 is a flowchart illustrating a method according to one or more embodiments.

FIG. 4 illustrates a method that may employ system 100, 200 in at least one embodiment. The method begins at block 400 and continues to block 402 where circuitry 126 may obtain event data, where the event data includes a time that each of one or more sensor outputs indicates an existence of a power consumption property at a corresponding measurement. As used herein, "event data" refers to data that is measured by a counter. In one embodiment, counter may comprise event counter 114, and event data may comprise the amount of time that each of sensors 108A, 108B, 108C, 108D indicates the presence of a power consumption property at a corresponding measurement. Other examples of event data may include number of cache misses, number of pipeline stalls, and that sensor outputs indicate the existence of a corresponding temperature range. Where the event data is the existence of a corresponding temperature range, for example, the "corresponding measurement" refers to the existence of a temperature range for a given sensor output.

At block 404, circuitry 126 may monitor one or more parts of one or more applications 120. As used herein, an "application" refers to a computer-accessible program that may comprise a plurality of instructions, such as machine-executable instructions. The plurality of instructions may be stored in a memory. Application 120 may comprise an entire set of instructions that make up a program, or it may comprise a subset of the instructions that make up a program. For example, application 120 may refer to one or more modules of the program. Furthermore, a part of an application 120 may refer to one or more lines of code in the application 120, or a specific module of the application, for example.

At block 406, circuitry 126 may correlate the one or more parts of application 120 with the power consumption property read from sensor outputs 108A, 108B, 108C, 108D. The correlation of information may be outputted, and/or accessed.

The method ends at block 408.

In one embodiment, circuitry 126 incorporating the method described above may be embodied in performance analyzer 116, 216. As used herein, a "performance analyzer" refers to an application that may use tools, such as a performance collector, to collect application information and correlate the information with event data. The correlated information may be used to analyze the performance of an application, such as application 120, where the application may comprise the performance analyzer 116, 216 itself, or one or more other applications 120. The performance analyzer 116, 216 may use the correlated information to provide recommendations for optimizing performance of the application 120. For example, the Intel® VTune™ Performance Analyzer (hereinafter "VTune™") is an example of a performance analyzer 116, 216 that may analyze an application 120 that may run on an XScale®-based processor 102, 202 such as an Intel® PXA25x or Intel® PXA26X processor. VTune™ may include one or more performance collectors 118, 218 to identify potential performance issues, and to provide recommendations for improving the application's 120 performance.

In VTune™, for example, active instruction addresses may be collected for analysis, where the collection of such data may be referred to as sampling. In VTune™, sampling may be accomplished by occasionally interrupting normal system execution to sample address instructions. An interrupt may be triggered after a preprogrammed number of events has occurred. Instruction addresses may be sampled, and then correlated with event data. For example, each time sensor output 108A may indicate a corresponding temperature range (or voltage drop) during execution of application 120, event counter 114 may be incremented (or may start a timer that tracks the amount of time at the temperature range).

When the event counter 114 reaches a specified value (e.g., time indicated by a sensor output exceeds 100 milliseconds), performance collector 118, 218 may sample an instruction address at the part of the application 120 currently being executed. The instruction address may correspond to one or more lines of code, and/or a specific module of the application. Performance collector 118, 218 may correlate the sampled instructions to a corresponding power consumption property. The executed instruction and power consumption property may then be recorded and/or outputted by performance analyzer 116, 216, for example, and be used to optimize performance and power consumption of the application 120.

In one embodiment, as illustrated in FIG. 1, performance analyzer 116 may be executed by processor 104 on a node different from the node on which application 120 being analyzed is executed. In this embodiment, processor 104 may comprise, for example, an Intel® Pentium® microprocessor that is commercially available from the Assignee of the subject application. In another embodiment, as illustrated in FIG. 2, performance analyzer 216 may be executed by processor 202 on the same node on which application 120 being analyzed may be executed. In this embodiment, processor 202 may comprise an Intel® XScale® microprocessor, for example.

Event counter 114, performance collector 118, 218, and performance analyzer 116, 216 may be comprised in software, such as machine-executable instructions that may be executed by circuitry, such as circuitry 126, of processor 102, 202. Of course, these programs may alternatively be comprised in firmware or in hardware. Also, machine-executable instructions may be stored in a memory (not shown) and executed by circuitry 126, such as in processor 102, 202.

Embodiments of the present invention may be provided, for example, as a computer program product which may include one or more machine-accessible media having machine-executable instructions that, when executed by one or more machines such as a computer, network of computers, or other electronic devices, may result in the one or more machines carrying out operations in accordance with embodiments of the present invention. A machine-accessible medium may include, but is not limited to, floppy diskettes, optical disks, CD-ROMs (Compact Disc-Read Only Memories), magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, or other type of media/machine-readable media suitable for storing machine-executable instructions.

Moreover, embodiments of the present invention may also be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection). Accordingly, as used herein, a machine-readable medium may, but is not required to, comprise such a carrier wave.

Conclusion

Therefore, in one embodiment, a method may comprise monitoring one or more sensor outputs of a sensor, the sensor to measure a power consumption property of the chip, and each sensor output to indicate a measurement of the power consumption property; and recording a time that each of the one or more sensor outputs indicates an existence of the power consumption property at the measurement corresponding to each of the one or more sensor outputs.

Embodiments of the invention may enable a system to determine how much time is spent at certain a certain power consumption property, such as temperature. In one embodiment, this information may be correlated with sampled instructions addresses in an application to determine how much power is consumed by various parts of the application. The correlated information may be used to optimize the application code.

In the foregoing specification, embodiments of the invention have been described. It will, however, be evident that various modifications and changes may be made to these embodiments without departing therefrom. The specifications and drawings are, accordingly, to be regarded in an illustrative rather than a restrictive sense.

What is claimed is:

1. A method comprising:
monitoring one or more sensor outputs, each of the one or more sensor outputs measuring a power consumption property of a chip; and
recording a total time that each of the one or more sensor outputs indicates an existence of the power consumption property at a corresponding predetermined value.

2. The method of claim 1, wherein the power consumption property of the chip comprises temperature, and the temperature comprises a temperature range including one or more temperatures.

3. The method of claim 2, wherein each sensor output corresponds to a corresponding temperature range, and indicates an existence of a temperature of the chip falling within the corresponding temperature range as measured at the corresponding sensor output.

4. The method of claim 1, wherein the power consumption property of the chip comprises voltage drop, and the voltage drop comprises a voltage drop range including one or more voltage drops.

5. The method of claim 4, wherein each sensor output corresponds to a corresponding voltage drop range, and each sensor output indicates an existence of a voltage drop falling within the corresponding voltage drop range as measured at the corresponding sensor output.

6. A method for analyzing operation of a chip executing an application, the method comprising:
monitoring one or more parts of the application;
obtaining event data from a sensor attached to the chip, the event data including one or more times that one or more sensor outputs of the sensor indicates an existence of a power consumption property of the chip being at least a corresponding predetermined value as measured at the one or more sensor outputs; and
for a first art of the one or more parts of the application being monitored, correlating the event data with one or more instruction addresses associated with the first part of the application.

7. The method of claim 6, wherein the power consumption property comprises temperature.

8. The method of claim 6, wherein the power consumption property comprises voltage drop.

9. An apparatus for analyzing operation of a chip executing an application, the apparatus comprising:
circuitry capable of:
monitoring one or more parts of the application;
obtaining event data from a sensor attached to the chip, the event data including one or more times that one or more sensor outputs of the sensor indicates an existence of a power consumption property of the chip being at least a corresponding predetermined value as measured at the one or more senor outputs; and
for a first part of the one or more parts of the application being monitored, correlating the event data with one or more instruction addresses associated with the first part of the application.

10. The apparatus of claim 9, wherein the power consumption property of the chip comprises temperature, and the temperature comprises a temperature range including one or more temperatures.

11. The apparatus of claim 10, wherein each sensor output corresponds to a corresponding temperature range, and indicates an existence of a temperature of the chip falling within the corresponding temperature range as measured at the corresponding sensor output.

12. The apparatus of claim 9, wherein the power consumption property of the chip comprises voltage drop, and the voltage drop comprises a voltage drop range including one or more voltage drops.

13. The apparatus of claim 12, wherein each sensor output corresponds to a corresponding voltage drop range, and each sensor output indicates an existence of a voltage drop falling within the corresponding voltage drop range as measured at the corresponding sensor output.

14. A system for analyzing operation of a chip executing an application, the system comprising:
circuitry on a first node, the circuitry connected to the chip and capable of:
monitoring one or more parts of the application;
obtaining event data from a sensor attached to the chip, the event data including one or more times that each of one or more sensor outputs of the sensor indicates an existence of a power consumption property of the chip being at least a corresponding predetermined value as measured at the one or more sensor outputs; and
for a first part of the one or more parts of the application, correlating the event data with one or more instruction addresses associated with the first part of the application; and
a performance analyzer on a second node, the performance analyzer communicatively coupled to the circuitry on the first node, the performance analyzer to use the correlated information.

15. The system of claim 14, wherein the power consumption property of the chip comprises temperature, and the temperature comprises a temperature range including one or more temperatures.

16. The system of claim 15, wherein each sensor output corresponds to a temperature range, and indicates an existence of a temperature of the chip falling within the corresponding temperature range as measured at the corresponding sensor output.

17. The system of claim 14, wherein the power consumption property of the chip comprises voltage drop, and the voltage drop comprises a voltage drop range including one or more voltage drops.

18. The system of claim 17, wherein each sensor output corresponds to a voltage drop range, and each sensor output indicates an existence of a voltage drop falling within the corresponding voltage drop range as measured at the corresponding sensor output.

19. A memory storing machine-accessible instructions, the instructions when executed by a machine, cause the machine to:
    monitor one or more parts of the instructions;
    obtain event data from a sensor attached to the machine, the event data including one or more times that each of one or more sensor outputs indicates an existence of a power consumption property of a chip being at least a predetermined value; and
    correlate the event data with the one or more parts of the instructions being monitored.

20. The memory of claim 19, wherein the power consumption property of the chip comprises a temperature range, and wherein the temperature range includes one or more temperatures.

21. The memory of claim 20, wherein each sensor output corresponds to a corresponding temperature range, and indicates an existence of a temperature of the machine falling within the corresponding temperature range as measured at the corresponding sensor output.

22. The memory of claim 19, wherein the power consumption property of the chip comprises voltage drop, and wherein the voltage drop comprises a voltage drop range including one or more voltage drops.

23. The memory of claim 22, wherein each sensor output corresponds to a voltage drop range, and each sensor output indicates an existence of a voltage drop falling within the corresponding voltage drop range as measured at the corresponding sensor output.

24. A method for analyzing operation of a chip based on an executing application, the method comprising:
    monitoring one or more portions of the executing application;
    obtaining one or more instruction addresses corresponding to the one or more portions;
    correlating the monitored one or more portions of the executing application corresponding to the one or more instruction addresses obtained with power consumption data obtained by a sensor on the chip; and
    storing data corresponding to the correlating.

* * * * *